Aug. 7, 1934.     A. C. GILBERT     1,968,884
CONDUCTOR CORD SUPPORTING AND PROTECTING MEANS
Filed Feb. 5, 1931
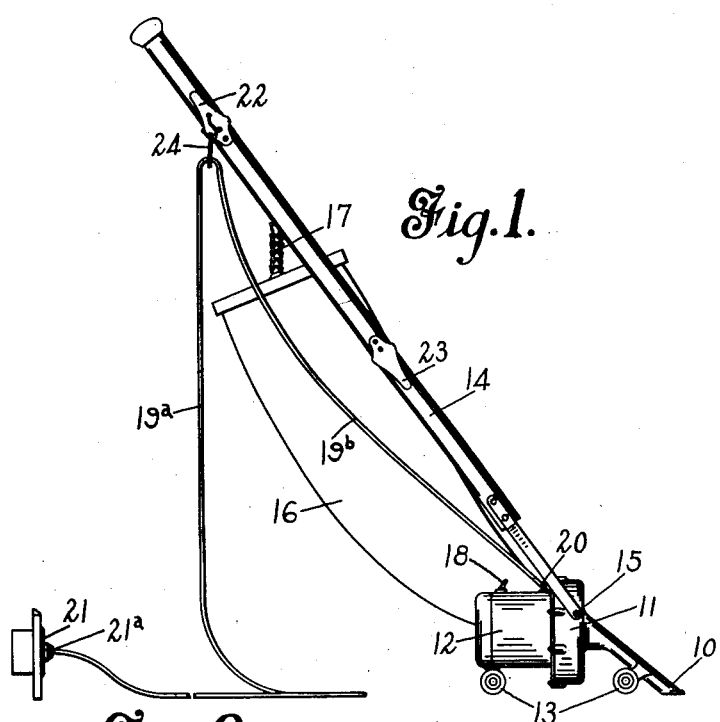
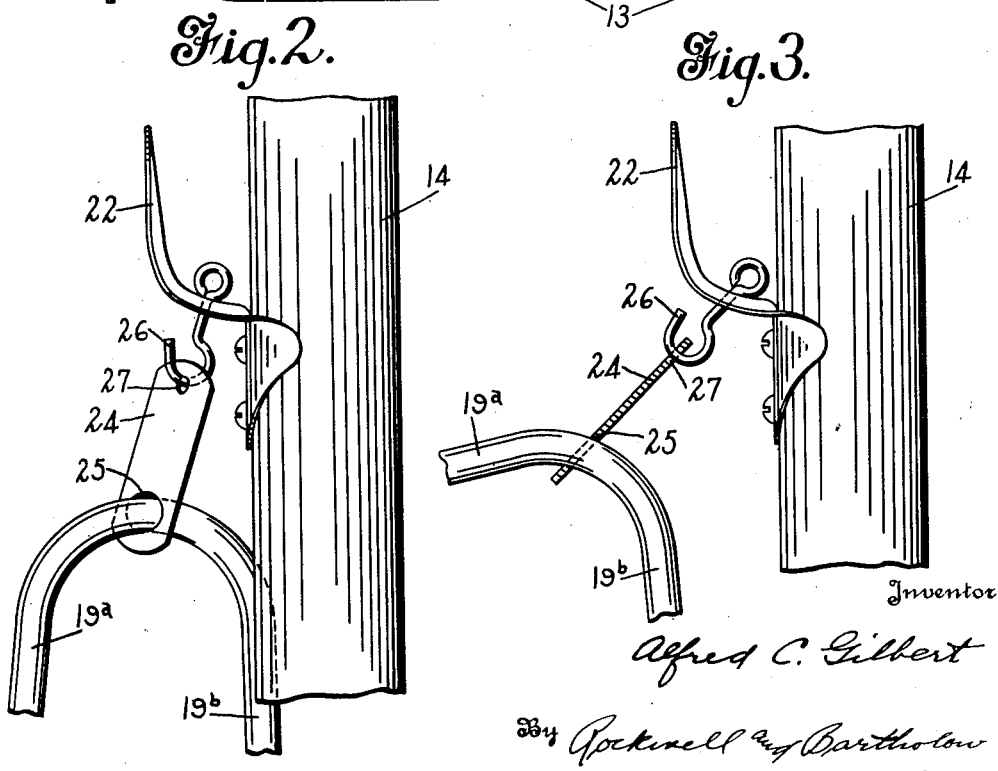

Patented Aug. 7, 1934

1,968,884

UNITED STATES PATENT OFFICE 1,968,884

CONDUCTOR CORD SUPPORTING AND PROTECTING MEANS

Alfred C. Gilbert, North Haven, Conn., assignor to The A. C. Gilbert Company, New Haven, Conn., a corporation of Maryland Application February 5, 1931, Serial No. 513,487

4 Claims. (Cl. 173—251)

This invention relates to conductor cord supporting and protecting means for electrical devices, such as vacuum cleaners of the portable type and more especially to an improvement in the suspending means for the electrical conductor cord with which said devices are generally equipped.

Devices of this character are usually provided with a handle for guiding the same over the surface to be cleaned, and in some instances, the electrical cord is threaded through or along the handle to a switch member disposed adjacent the upper end thereof. It has been found convenient and advantageous in the manufacture and use of some forms of vacuum cleaners of this type to dispose the switch member adjacent to or upon the cleaner casing. In this form, the cord suspending means of this invention is particularly useful in order that the portion of the conductor cord that is closely adjacent the cleaner casing will not be permitted to drag along the floor and become entangled with the cleaner parts, or articles of furniture or the like.

Occasionally during the use of this type of vacuum cleaner, the cord is suddenly pulled taut between the wall or floor connection and the cleaner, in attempting to reach portions of the room remote from the wall or floor socket to which the plug at the end of the cord is connected. The strain occasioned by the sudden drawing of the cord taut has been found to be sufficient, in some instances, to pull the conductors away from their connection with the switch or motor, resulting in damaging short circuits. A cord suspending means that will relieve the cord from strains that might cause this inconvenience is desirable. It is also desirable that the cord suspending means be of such structure that the cord may be readily drawn therethrough in order to take up slack or to increase the length of the cord at either side of the suspending means. It is also an advantage to permit the cord freedom of movement at the point of suspension in order that the insulation about the conductors making up the cord will not be cracked or broken due to repeatedly being sharply and abruptly bent.

One of the objects of this invention is to improve vacuum cleaners or the like of the portable type by the provision of an electrical conductor cord suspending means that will hold the portion of the cord adajacent the cleaner away from the floor, and which is economical to manufacture and efficient in use.

Another object of this invention is to provide an improved electrical conductor cord suspending means for electrical devices, such as vacuum cleaners, that is detachably secured to the handle of such device, permits free movement of the cord while the device is in use, eliminates or reduces undue strains upon the cord and readily permits the take-up of slack in and the lengthening of the portion of the cord adjacent the device.

To these and other ends, the invention consists in the novel features and combinations of parts to be hereinafter described and claimed.

In the accompanying drawing:

Fig. 1 is a side view of a vacuum cleaner, embodying the principles of this invention;

Fig. 2 is an enlaged view of the cord suspending means, and

Fig. 3 is an enlarged view of the cord suspending means showing the position of the parts thereof when the same acts to prevent one of the strains encountered in use.

I have chosen to illustrate the features of my invention embodied in the structure of a vacuum cleaner of the portable type. Such a vacuum cleaner generally comprises a floor engaging nozzle 10, the interior opening of which is in communication with the interior of a suction fan casing 11, the fan of which is driven at high speed by an electric motor enclosed in a casing 12, which is suitably secured to the fan casing 11. These parts of the cleaner are generally provided with floor engaging rollers 13 upon which they may be moved about the floor by means of a handle 14 that is swingingly secured to the cleaner as at 15. A dirt bag 16 is also provided into which the dirt removed from the rug or floor is blown by the action of the suction fan. The dirt bag may be suspended from the handle 14 as at 17.

The electric motor of such a cleaner is usually controlled by a switch which, in this instance, is shown mounted within the casing 12 with an operating finger 18 therefor protruding therefrom. An electric conductor cord containing the required conductors, passes into the casing at 20 wherein the conductors are connected to the proper motor and switch terminals. The conductor cord is of considerable length in order to permit the movement of the cleaner about the floor to reach points at some distance from the floor or wall plug socket 21, with which the plug 21ª attached to the end of the cord is connected. When the cleaner is not in use, the conductor cord may be coiled upon the handle 14 and retained thereon by clips 22 and 23.

The conductor cord has portions 19ᵃ and 19ᵇ, 19ᵃ being that portion of the cord extending from the upper part of the handle 14 to the wall socket 21, and portion 19ᵇ being that part of the conductor cord extending from the upper part of the handle to the motor casing 12 at 20. At the juncture of said portions the cord is suspended detachably from the handle. The suspending means preferably comprises a flat narrow strip 24, preferably of thin insulating material, such as pressed wood fibre. The strip 24 at one end thereof is provided with an enlarged opening 25, slightly larger in diameter than the diameter of the conductor cord, whereby the cord may be readily slipped therethrough during assembly and when the cleaner is in use, to take up any slack that might occur between the suspending means and the motor casing 12, or to provide more length of cord at either side of the suspending means when such is required.

The relation between the diameters of the opening 25 and the conductor cord is such that should the portion 19ᵃ of the cord become taut, due to the cleaner being used at a distance from the wall socket 21, the cord will be gripped by the strap 24, as shown in Fig. 3, to prevent the strain thus occasioned being transmitted to the portion 19ᵇ of the cord to pull or tear the conductors away from the terminals to which they are connected within the casing 12. Short circuits or the like within the casing 12 are thus avoided, the plug 21ᵃ being disconnected from the wall socket 21 by the strain instead of disconnection taking place within the motor casing.

The strip 24 is detachably secured to the handle 14 by means of a hook 26, an end of which passes through another opening 27 provided in the strip 24 at the other end thereof. Free swinging movement is permitted between the hook 26, strip 24, and the conductor cord due to the relative diameters of the hook shank and the opening 27. The hook 26 is connected to handle 14 by a swivel connection which permits further freedom of movement for the strip 24 and the conductor cord. This swivel connection is formed, in this instance, by threading the hook 26 downwardly through an opening in the upper cord supporting clip 22, there being an eye on the hook above the clip to act as a stop and prevent it passing completely through the clip. After the hook is inserted into position in the clip the strip or holder 24 can be connected to the projecting lower hook-shaped portion. The hook can turn on its axis while in this position but cannot be displaced from its support. The hook can be readily removed, however, after the cord holder 24 is released therefrom.

The above described cord suspending structure is especially useful when applied to vacuum cleaners of the type described, but is not limited to such use as it will be found useful when applied to other portable electrical devices, such as floor scrapers and polishers. By its provision in connection with such devices, the conductor cord is suspended from the handle 14 at its upper end and is held out of possible entanglement with the cleaner and articles of furniture that might be adjacent thereto. Being disposed adjacent the hand grasping end of the handle, it is convenient to the operator, permitting him to slip the cord through the opening 25 in the strip 24 to take up slack occurring in the portion 19ᵇ of the cord when this is desired. By making the opening 25 slightly larger in diameter than the conductor cord, the latter will easily slip through the same in either direction whenever a slight pulling tension is applied to the cord.

The feature whereby the suspending means grips the cord upon the occasion of portion 19ᵃ thereof being suddenly pulled taut, protects the motor and switch against possible damaging short circuits and insures the safe operation of the vacuum cleaner or other device. Being freely swingable in any direction and loosely held by the use of the suspending means of this invention, the conductor cord is protected against wear and breakage due to constant and repeated bending, which is frequently experienced when an electrical extension cord is rigidly held at any point.

While I have shown and described a prefererd embodiment of my invention, it will be understood that it is not to be limited to all the details shown but is capable of modification and variation within the spirit of the invention and the scope of the appended claims.

What I claim is:

1. In an electrical device, an electrically operated member, an elongated handle pivotally secured at one end thereof to said electrically operated member, a flexible conductor cord leading from said electrically operated member along said handle toward the outer end thereof, a cord-receiving member secured adjacent the outer end of said handle, a cord-supporting member adjacent said cord-receiving member and having a perforation therein through which said cord may freely slide when the cord axis and the axis of the perforation are in alignment, said cord being threaded through and supported in the perforation and extended therebeyond, and a member connecting said cord-supporting member to said cord-receiving member, said connecting member being pivotally and swingingly secured to said cord-receiving member, and said cord-supporting member being pivotally and swingingly secured to said connecting member whereby said cord-supporting member will freely swing and rotate in any direction relatively to said cord-receiving member and grippingly engage said cord within the perforation therein to prevent sliding movement of said cord therethrough whenever the portion of said cord beyond said supporting member is drawn taut.

2. In an electrical device, a handle, electrically operated means secured to one end of said handle, a conductor cord leading from said electrically-operated means to a source of electrical energy, cord-supporting means disposed adjacent the other and outer end of said handle, said cord-supporting means comprising a hook-like cord-holding member secured to the outer end of said handle and a member having a perforation in one of its ends, said handle being normally directed outwardly away from said electrically operated means, said conductor cord being directed away from said electrically operated means toward the outer end of and along said handle, threaded through the perforation in said perforated member, and then directed to the source of energy, means to secure said perforated member to said hook-like member for swinging movement in any direction, the portion of said cord directed from said perforated member toward the source of energy when drawn taut cooperating with said perforated member to swing the same relatively to said hook-like member and cause it to bindingly engage said cord within the perforation therein to prevent strains being imposed upon the portion of said cord disposed between said electrically operated means and said members.

3. In combination, an electrically operable device, a conductor cord leading from said device to a source of electrical energy, cord-supporting means disposed remote from said device, said cord-supporting means comprising a member to receive said cord when the latter is not in use, a member having a perforation in one of its ends, said cord being directed away from said device toward said cord-supporting means, threaded through the perforation in said perforated member and then directed to the source of energy, and means to secure said perforated member to said cord-receiving member for swinging movement in any direction, the portion of said cord directed from said perforated member toward the source of energy when drawn taut cooperating with said perforated member to swing the same relatively to said cord-receiving member and cause it to bindingly engage said cord within the perforation therein.

4. Conductor cord supporting and protecting means comprising a member to loosely receive an elongated electrical conductor cord when the latter is not in use, a member having a perforation in one of its ends to receive the conductor cord threaded therethrough with said member disposed intermediate the ends of the conductor cord, and means to secure said perforated member to said cord-receiving member for swinging movement in any direction, said perforated member cooperating with the cord threaded through the perforation therein to be swung thereby relatively to said cord-receiving member and to bindingly engage the cord within the perforation when the cord is drawn taut at one side of said member to prevent the cord slipping through the perforation therein and causing a strain on the cord at the other side of said perforated member.

ALFRED C. GILBERT.